UNITED STATES PATENT OFFICE.

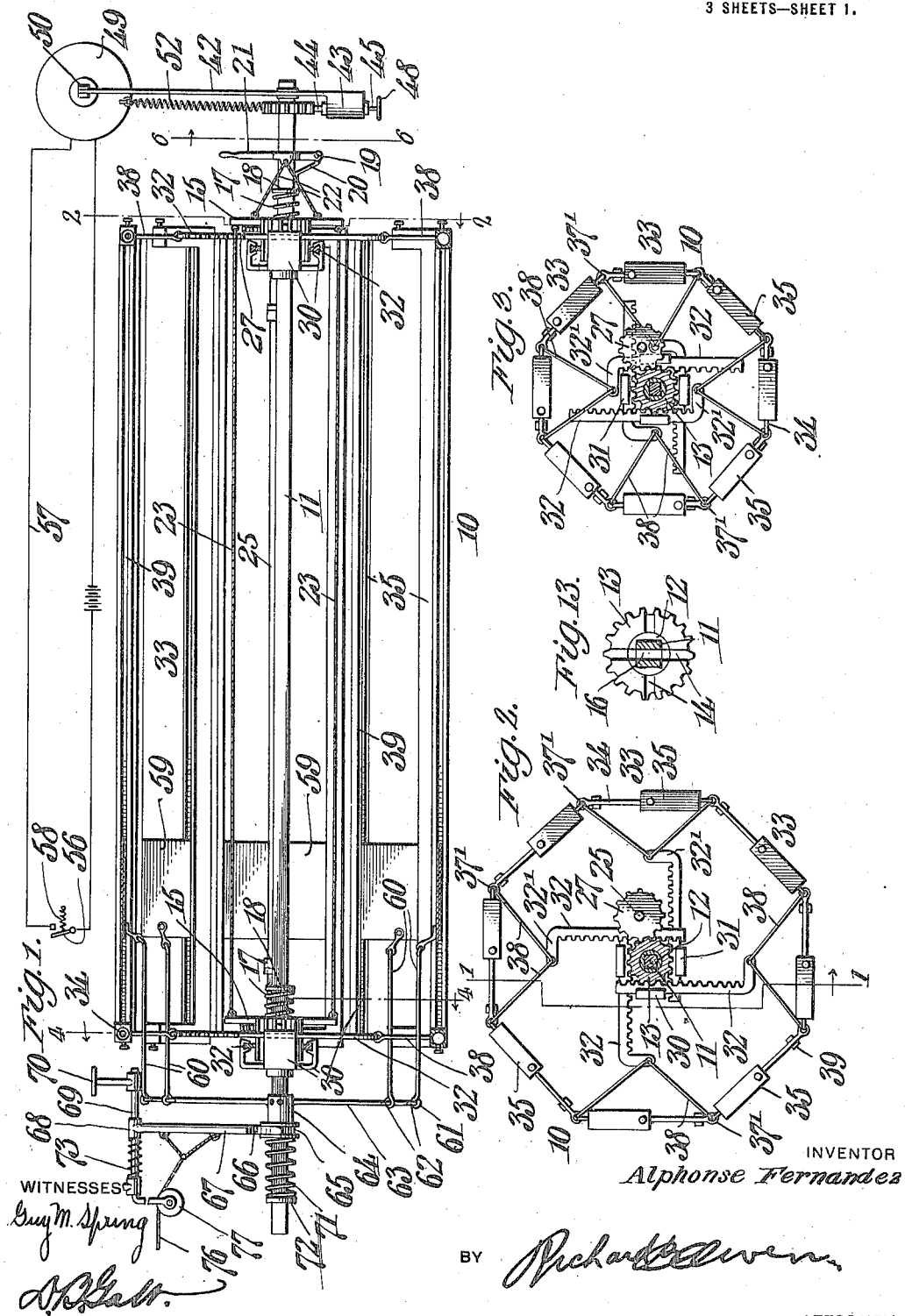

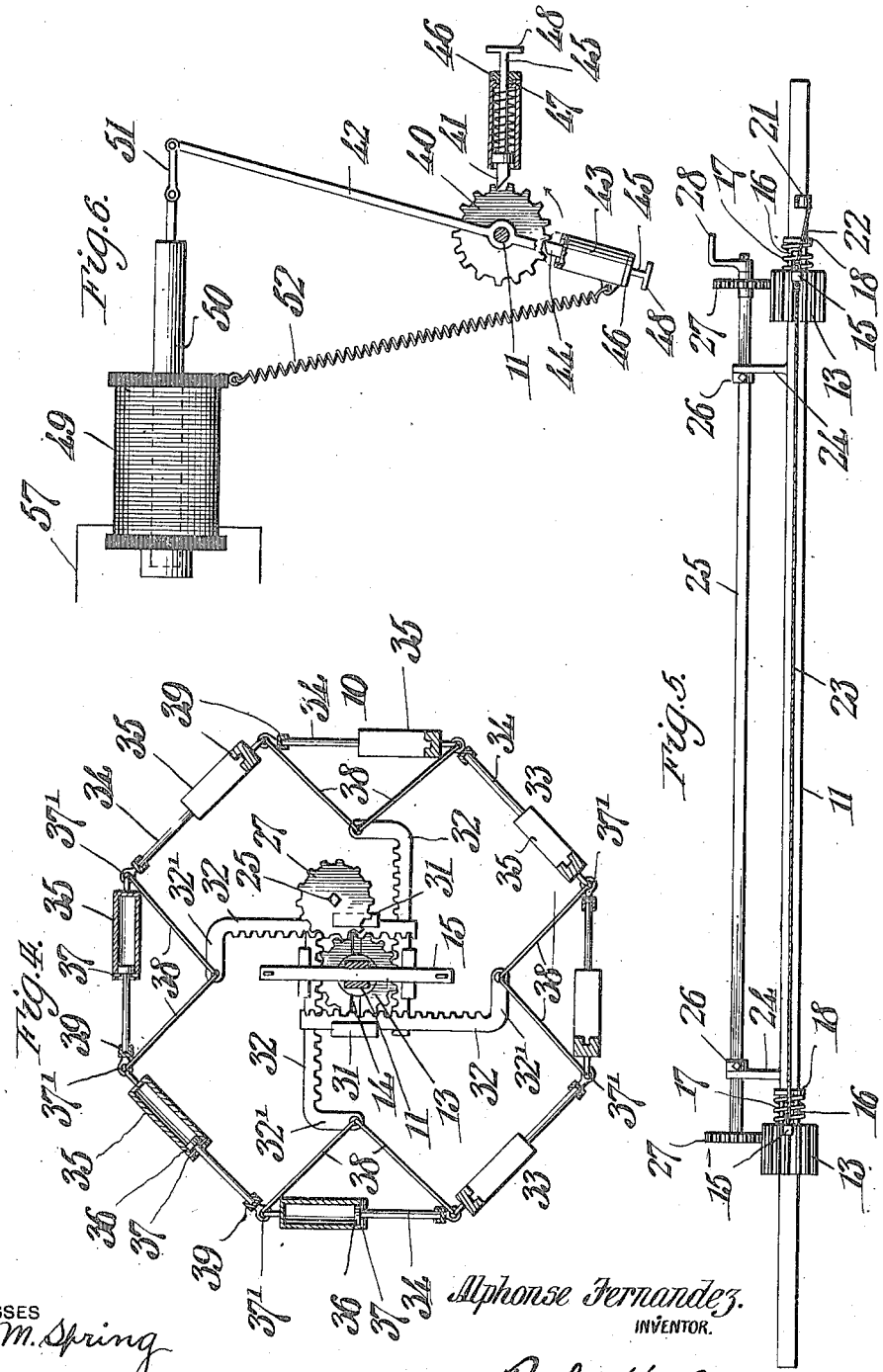

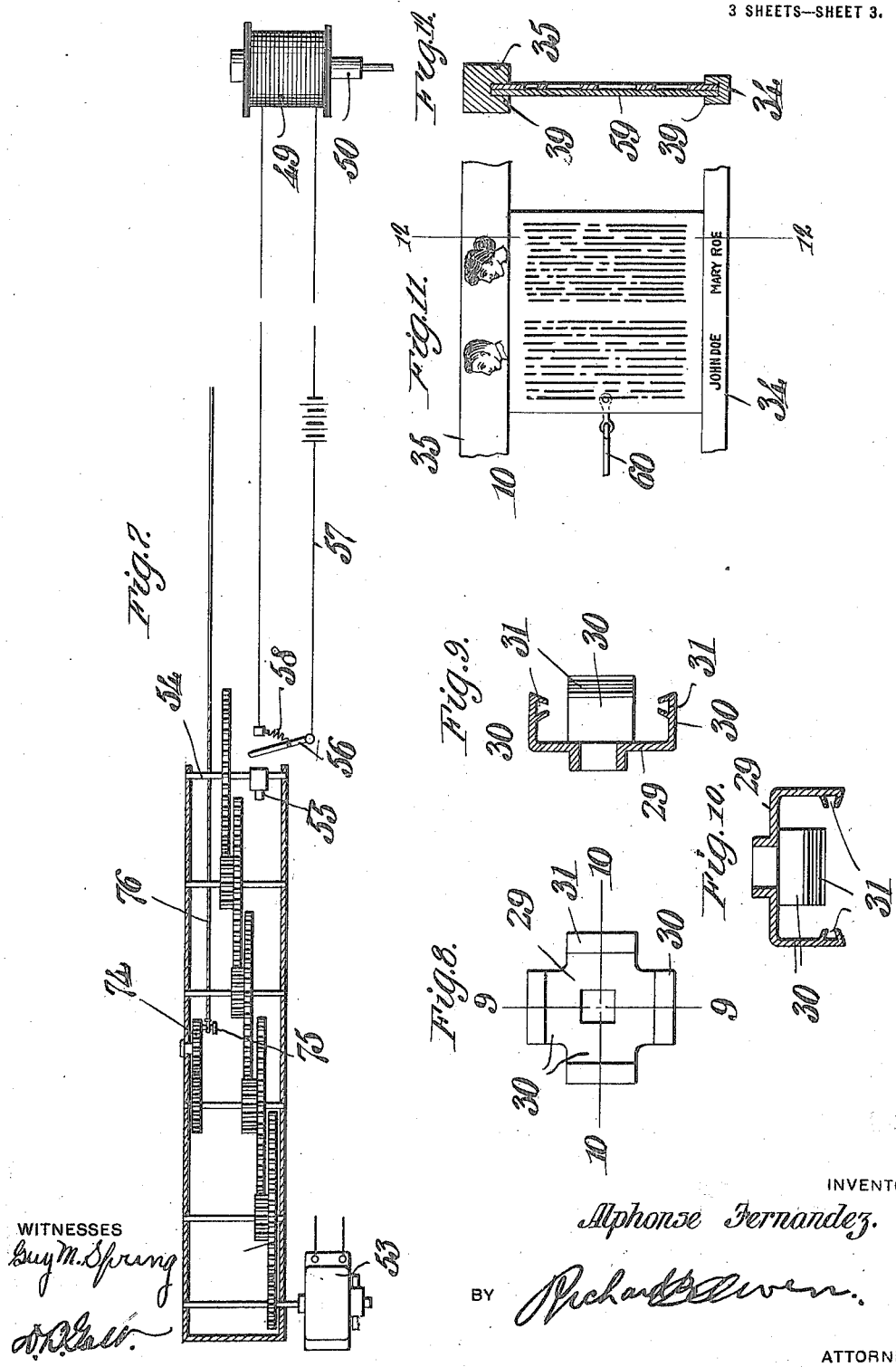

ALPHONSE FERNANDEZ, OF WASHINGTON, DISTRICT OF COLUMBIA.

ADVERTISING DEVICE.

1,254,787.
Specification of Letters Patent.
Patented Jan. 29, 1918.

Application filed January 10, 1917. Serial No. 141,646.

*To all whom it may concern:*

Be it known that I, ALPHONSE FERNANDEZ, a subject of the King of Spain, residing at Washington, in the District of Columbia, have invented certain new and useful Improvements in Advertising Devices, of which the following is a specification.

This invention relates to advertising devices, and aims primarily to provide means whereby a great number of advertising signs or cards may be displayed in a relatively small space. A further object is to provide an advertising device adapted particularly for use in street or railway cars, and wherein improved means is provided for attracting and retaining the attention of the passengers to the matter displayed by the advertising medium.

A still further object resides in providing an advertising mechanism of this character which is of the changeable exhibitor type, and wherein the various advertisements, pictures or printed matter are brought successively into view and held in such position a predetermined period of time.

A still further object of the invention is to provide an advertising mechanism of the character set forth which is so constructed and arranged as to be adaptable to cars or vehicles varying in size and construction, and includes means for readily adjusting the mechanism to fit within the space allotted for its use.

The invention further provides an advertising device which includes a rotatable drum, and the said drum may be actuated by suitable mechanism controlled by the movements of the vehicle with which it is used, or its movements may be controlled by a motor or other mechanism operating independently of the movement of the vehicle.

With these objects in view, together with others which will appear as the description proceeds, the invention consists generally in the arrangement of a rotatable drum in the form of a polygon, the various sides of the drum being adapted to contain advertising matter, and each of the said sides is equipped with a mechanism for exhibiting motion pictures, whereby the attention of the passengers of the vehicle is attracted and directed to the advertising matter.

The invention further consists in providing an advertising drum of this character and means for rotating the same intermittently, so that the various sides may be successively presented to view.

Still further, the invention resides in the novel formation, combination and arrangement of parts, all as will be described more fully hereinafter, illustrated in the drawings, and particularly pointed out in the claims.

In the drawings:—

Figure 1 is a longitudinal sectional view taken through an advertising drum constructed and arranged in accordance with the invention; the view being taken substantially upon line 1—1 of Fig. 2;

Fig. 2 is a transverse sectional view taken upon line 2—2 of Fig. 1;

Fig. 3 is a view similar to Fig. 2, and illustrating the drum in contracted form;

Fig. 4 is a sectional view taken upon line 4—4 of Fig. 1, and showing the drum in its expanded form;

Fig. 5 is a top plan view of the drum supporting shaft, counter shaft, and the means for transmitting power from the counter to the drum shaft;

Fig. 6 is an enlarged elevation of the magnet for delivering movement to the drum shaft;

Fig. 7 is a plan view of the gear train for operating the life-like pictures in the drum, and also for intermittently energizing the electro-magnet;

Fig. 8 is a front elevation of one of the plates used in connection with the drum shaft for supporting the rack bars;

Fig. 9 is a sectional view taken upon line 9—9 of Fig. 8;

Fig. 10 is a similar view taken on line 10—10 of Fig. 8;

Fig. 11 is an enlarged fragmentary elevation illustrating the motion picture producing apparatus;

Fig. 12 is a sectional view taken upon line 12—12 of Fig. 11; and

Fig. 13 is a sectional view taken through the drum supporting shaft, and illustrating the inner face of one of the gears thereon.

Referring now to the drawings, 10 represents generally the advertising drum, the same being in the present instance octagonal in form, and is of a length preferably equal to that of the space allotted for the advertising signs or cards. While the drum in the present instance is shown as being eight sided, it is to be understood that I shall not be restricted to such a drum, as the same may be constructed so as to provide more or less advertising surfaces as preferred.

Extending centrally and longitudinally through the drum is a supporting shaft 11. This shaft is illustrated as being square in cross section, and carries spaced bearing bushings 12 upon which are mounted gears 13, the latter being capable of rotating upon the said bushings. It will be observed that the shaft 11 carries two of the gears 13, and the latter are disposed upon the shaft at substantially the ends of the drum 10. The forward faces of the gears 13 are notched or grooved as at 14 so as to receive or accommodate clutch bars 15 extending through longitudinally disposed slots 16 in the shaft 11. Surrounding the shaft 11 adjacent each of the gears 13 are expansion springs 17, the latter being each engaged at one end with a collar 18 affixed to the shaft, and at its opposite end with the adjacent clutch bar 15; the springs normally holding the clutch bars in engagement with the notched faces of the gears 13.

Pivoted at one end as at 19 to a bracket 20 secured to the shaft 11 and adjacent the forward end of the latter is a lever 21, the said lever being connected as by ropes, wires, or links 22 to the foremost of the clutch bars 15. This clutch bar is connected by ropes or wires 23 to the clutch bar 15 at the rear end of the shaft, and it is obvious that outward pull delivered to the lever 21 will cause both of the clutch bars to slide forwardly within their respective slots 16 against the tension of the springs 17, and out of engagement with their respective gears. When thus released, the gears may be freely rotated upon their bearing bushings 12, and such rotation may be created and maintained entirely independent of movements of the shaft 11. When the lever 21 is released, the springs 17 will force the clutch bars 15 rearwardly, or into locking engagement with their respective gears, whereupon the said gears are held against independent rotation.

Mounted for rotation in suitable brackets 24 supported upon the shaft 11 is a counter-shaft 25. This counter-shaft is disposed in spaced parallel relation to the shaft 11, and is prevented from moving longitudinally within the brackets 24 by the limiting collars 26 affixed to the said counter shaft. This counter shaft carries pinions or gears 27, which are in mesh with the gears 13 upon the shaft 11. A crank 28 is detachably secured to the forward end of the counter shaft 25, so that rotary movement may be manually created in the said counter-shaft. When the gears are locked to the shaft 11 by means of the clutch bars 15, the pinions 27 will also be locked and the counter shaft 25 can not be rotated. However, upon disengagement of the clutch bars from their respective gears, rotary movement developed in the counter shaft 25 will be transmitted by means of the pinions 27 to the gears 13.

Carried by the shaft 11 and adjacent each of the gears 13 is a plate 29. Each plate has a plurality of forwardly extending arms 30, which extend over the periphery of the adjacent gear 13. There are four of the arms 30 in the present instance, and each arm carries at its forward end a guide 31 disposed at right angles to the next adjacent guides. Slidably arranged within these guides and supported by the latter are rack bars 32, the teeth of the latter being engaged with the teeth of the adjacent gear 13. The arrangement is such that the rack bars associated with each gear are arranged in pairs; the bars of each pair being disposed at right angles to the bars of the opposite pair, and the guides 31 are so arranged that when the gears 13 are rotated to extend or retract the rack bars, the latter will not abut or engage each other. When the clutch bars 15 are operated so as to release the gears 13, rotation of the counter-shaft will create rotary movement in each of the said gears, whereupon the rack bars 32 will be slid within their guides radially, or substantially so, relative to the shaft 11. The direction of movement of the rack bars will, of course, depend upon the direction of rotation of the gears 13.

The octagonal drum within which the above described mechanism is located, comprises a plurality of telescopic sections indicated generally at 33. Each of these sections includes a pair of substantially U-shaped frames, the said frames being indicated specifically at 34 and 35 respectively. The parallel end members or legs of the frame 35 are hollow, and the lower or bight portion of the frame is as long as it is desired the drum shall be. The frame 34 is of equal length with its coöperating frame, and the parallel leg portions of the said frame extend or telescope within the corresponding hollow portions of the frame 35. The extremities of the legs of the frame 34 are equipped with heads 36, and locking pins 37 extend into the hollow portions of the legs of the frame 35 adjacent the outer ends thereof to prevent the heads 36 becoming entirely separated from the legs of the frame 35. This construction permits of the frames being so moved that the section which they constitute may be extended or retracted, and the bight portions of the frames remain parallel. The sections thus constructed are hinged together as at 37'; the various sections being so assembled as to produce the polygonal drum above mentioned.

The outermost end of each of the rack bars 32 is provided with an angularly disposed arm 32' and to which are connected the frame members 34—35 of certain of the drum sections 33. This connection is effected by means of links 38, the inner ends of the links being looped through an eye in the arm of the rack bar, which eye is in radial alinement with the shaft 11, while the outer ends of the links are pivoted adjacent the bight portions of the frame members 34—35. As there are but four of the rack bars at each end of the shaft 11 as against eight of the sections to the drum, the said rack bars are linked to the alternate sections, and it is apparent that when the gear 13 is rotated so as to retract the rack bars 32, the various collapsible sections to which the rack bars are linked will be moved bodily inwardly. As the alternate sections are moved inwardly, the intermediate sections will in a like manner travel, and as this inward movement of the sections will cause the latter to collapse or telescope, the diameter of the drum will be diminished. Rotary movement delivered to the gear 13 in the opposite direction will force the rack bars outwardly, and this movement of the bars will, through the links 38, cause the alternate sections to move bodily outwardly and to expand. Obviously, the intermediate sections will in a like manner extend, and the diameter of the drum is thus increased. After the rack bars have been moved a distance sufficient to give to the drum the desired size, the lever 21 may be released, whereupon the springs 17 will force the clutch bars 15 into engagement with their respective gears, and the latter will be locked against further movement. Locking of the gears 13 in this manner prevents rotary movement of the pinions 27, and consequently the rack bars can not slide. Set screws may be arranged in the legs of the frame members 35 to engage the legs of the frame 34, so as to assist in holding the sections in their various positions of adjustment. The polygonal drum is thus held to the proper size, and rotary movement delivered to the shaft 11 will cause the drum also to rotate.

The space between the frames of each of the sections 33 of the drum is to be utilized for advertising cards or panels, and the bight portions of the U-frames 34 and 35 are equipped with inwardly extending guide strips 39, the latter forming between them suitable grooves or channels for the accommodation of the bottom and top edges of the advertising cards. In applying the cards to the various sections, the cards may be slightly sprung or bent until the edges thereof are seated within the oppositely disposed grooves in the said U-frame. It will be understood, of course, that cards of various widths must be provided, so as to be adaptable to the various sections in their collapsed or extended positions.

The forward end of the shaft 11 is equipped with a ratchet wheel or gear 40, with which is engaged a spring pressed pawl 41, to prevent the shaft being rotated in a retrograde direction. Pivoted inwardly from one end upon the shaft 11 and in close proximity to the wheel 40 is a lever 42. This lever carries at its lower end a housing 43, within which a detent 44 travels. This detent is normally held in engagement with the teeth of the ratchet wheel 40 by a suitable spring, and is capable of playing idly over the ratchet teeth when the lever is moved in one direction. When the lever 42 is moved in the direction indicated by the arrow in Fig. 6, the detent 44 will engage with the teeth of the wheel 40, whereupon the said wheel will be carried by the lever. Reverse movement of the lever will in no way affect the movement of the ratchet wheel, as the pawl 41 locks the wheel against retrograde movement. It is preferred that the pawl and detent 41 and 43 respectively be so arranged as to be capable of being reversed within their respective housings, so that the lever 42 may be enabled to operate upon the ratchet wheel 40 in either direction. To this end, the stem 45 of each detent carries a collar 46 adjacent its outer end and this collar is provided with locking lugs 47 for engagement within notches formed in the outer end of the detent or pawl housing. A handle 48 is also attached to the stem, so that manipulation of the pawl or detent may be readily effected. This particular arrangement permits of the pawls being readily reversed for the purpose above mentioned.

The means employed for exerting the desired pull upon the lever 42 is illustrated more particularly in Fig. 6 of the drawings, and comprises a solenoid indicated at 49. The core 50 of the solenoid or magnet is connected as by means of a link 51 to the outer end of the lever 42, and it is apparent that when the magnet is energized, the inwardly moving core 50 will cause the lever 42 to operate upon the ratchet wheel 40 to partially rotate the shaft 11. A cap or housing is secured to the inner end of the solenoid in alinement with the core opening, and forms a dash pot or air cushion to absorb the shocks incident to the violent inward thrusts of the core when the magnet is energized. A contractile spring 52 is secured at one end to the lower end of the lever 42, and at its opposite end to the solenoid 49 or some other fixed member, so that when the electric circuit through the solenoid is broken, the spring 52 will move the lever 42 in a reverse direction, and the core 50 will be moved outwardly of the magnet. When the pawl and detent 41 and 44 respectively are reversed in their housings, it is apparent that the magnet when energized will move the lever 42 so that the detent 44 carried thereby will idle over the ratchet wheel, and when the circuit through the magnet is broken, the spring 52 will exert inward pull upon the lever and the detent 44 will cause the lever and ratchet wheel to lock together, whereby the shaft 11 will be rotated under impulse of the spring 52.

In Fig. 7 of the drawings, there is illustrated a train of gears, which are driven in the present instance by a motor indicated at 53. It will be understood, however, that the particular construction or arrangement of the gear train and its propelling means need not be identical with that herein disclosed, as a spring motor may be used in place of that shown in the drawings, or more or less intermeshing gears may be employed in the train as desired. One of the arbors or shafts 54 in the gear train is provided with a cam or projection 55, which is adapted once in each rotation of the said arbor to engage the switch arm 56 in an electric circuit indicated generally at 57. The switch 56 is normally held open by the spring 58, but is forced into closed position by the cam or projection 55. The solenoid or magnet 49 is included in this electric circuit, and it is obvious that the speed of rotation of the arbor 54 will govern the length of time between the closing of the circuit by the switch 56. In this manner a step by step movement of the advertising drum is created.

The advertising spaces in the various sections at one end thereof are devoted to means for attracting the attention of persons to the device and the cards exhibited thereby. Slidably arranged in the channels provided for the advertising cards, are plates or cards 59. These plates have pictured thereon the images or likenesses of persons, and the pictures are so arranged or displayed upon these plates that reciprocation of the latter will cause the representations to simulate life-like movements. The plates 59 in the present instance are arranged near the rear end of the advertising drum, and each is equipped with a rearwardly extending rod or bar 60. The rear ends of these bars are provided with eyes 61, in which are looped eyes 62 of arms 63 secured at their inner ends to a sleeve 64 slidably arranged upon the shaft 11. The sleeve 64 carries a grooved wheel 65, which is engaged by a fork 66 carried at one end of an arm 67 carried by a collar 68 slidably mounted upon a shaft 69 rigidly secured in suitable brackets 70 upon the vehicle with which the device is used. An expansion spring 71 engages at one end against a collar 72 affixed to the shaft 11, and bears at its opposite end against the collar 64 to normally force the same inwardly. The collar 68 is in a like manner forced inwardly by a spring 73 encircling the shaft 69.

A gear 74 in the train before mentioned is provided with an eccentrically arranged stud or pin 75, to which one end of a cord or rope 76 is attached. The rope extends over a suitable guide pulley 77, and connects with the arm 67 as shown. From this construction, it is apparent that as the gear 74 rotates, the cord 76 will be tensioned and the arm 67 and sleeve 64 will be retracted against the tension of the springs 71 and 73. This movement will cause the picture plates 59 to move toward the end of the drum, and as the gear 74 further rotates, the cord 76 will be slackened, whereupon the springs 71 and 73 will force the sleeves 64 and 68 forwardly, so that the plates will be moved inwardly from the rear end of the drum. Reciprocation of the plates is thus carried on so long as the motor is in operation, and reciprocatory movement in the plates is maintained during rotation of the drum. If desired, the picture of the persons depicted upon the moving plates may be made upon fixed parts of the advertising drum, and preferably above or below the space by which the plates slide, so that the passengers in the vehicle may ascertain the persons represented.

By linking the radial arms 63 with the connecting rods 60 of the picture plates, it is apparent that the size of the advertising drum may be varied without impairing the operativeness of the plate sliding mechanism.

In operation, the advertising drum is arranged within the vehicle and preferably along the sides thereof. If used in connection with a street car, the drum would be positioned along the space now generally used for the display of advertising cards. The size to which the drum will be adjusted will depend, of course, upon the breadth of the space in the particular place or vehicle, and after the drum has been properly adjusted, the crank may be removed from the operating shaft. The advertising cards are then inserted in the various spaces, and the picture cards are also properly positioned in the various sides of the drum. The gear train may then be set in motion, whereupon the picture slides will move back and forth to simulate moving pictures, and the drum will be intermittently rotated. The interval between partial rotations of the shaft 11 is preferably such as will permit of the spectators reading the card displayed by the side of the drum presented to view. The various sides of the drum are thus presented successively to view, and during rotation of the drum, the picture slides constantly reciprocate. The construction of the device is such that the various movable elements are positively controlled, and inoperativeness is thus prevented. The various movable parts are also so constructed, arranged and assembled as to minimize the opportunity for wear, breakage or derangement. The ready removability of the advertising cards permits of changes in the reading matter being quickly and easily made.

The invention has been described as used in connection with vehicles, but it will be understood that its use is not so restricted, as the same may be operated and maintained in a manner equally as effective and efficient within buildings or out of doors.

While the present disclosure is that of what I believe to be the preferred embodiment of the invention, it is to be understood that the invention is not limited thereto, but that various changes may be made in the construction, arrangement, and proportion of parts, without departing from the spirit of the invention, as defined in the appended claims.

What is claimed is:—

1. In a device of the class described, a polygonal drum, the edges of each of the sides of said drum being provided with grooves, a plate for each side of said drum and having its edges engaged in said grooves, a rod connected to each plate, a common rod connecting all of the first mentioned rods, and means for reciprocating said common rod.

2. In a device of the class described, a drum, a plate mounted for sliding movement longitudinally of said drum, a rod connected to said plate, a sliding sleeve, the said rod being connected to said sleeve, a rotatable member, and means governed by the movement of said rotatable member for sliding said sleeve.

3. In a device of the class described, a plurality of plates capable of sliding back and forth, a sleeve, a connection between each plate and said sleeve, a spring for holding said sleeve at the limit of its movement in one direction, a rotating member, and a cord connecting said rotating member and said sleeve, whereby the said sleeve will be moved in one direction against the tension of said spring upon rotation of said member.

4. In a device of the class described, a polygonal drum, each side of said drum having a pair of oppositely disposed grooves, a plate mounted for sliding movement on each side of said drum and in said grooves, means for sliding said plates, and means for rotating said drum.

5. In a device of the class described, a rotatable drum having radially movable sections so as to be capable of being expanded and contracted, a rotatable gear concentric with said drum, and a rack bar secured to each section and in mesh with said gear.

6. In a device of the class described, a drum comprising a plurality of hingedly connected sections, each of said sections being telescopic, and means for radially moving said sections.

7. In a device of the class described, a drum comprising a plurality of hingedly connected sections, each of said sections being telescopic, and means for expanding and contracting the alternate sections.

8. In a device of the class described, a drum comprising a plurality of sections connected together, each of said sections being telescopic, a rotatable shaft, and means governed by the movements of said shaft for moving certain of said sections radially.

9. In a device of the class described, a drum comprising a plurality of sections connected together, each section being telescopic, a rotatable shaft, a gear on said shaft, rack bars in mesh with said gear, and connections between certain of said sections and said rack bars.

10. In a device of the class described, a drum comprising a plurality of sections connected together, each section being telescopic, a gear arranged centrally of said drum, a plurality of rack bars in mesh with said gear, connections between said rack bars and certain of said sections, and means for rotating said gear.

11. In a device of the class described, a drum capable of being expanded or contracted, a gear arranged centrally of said drum, rack bars in mesh with said gear, links connecting said drum with said rack bars, and means for rotating said gear.

12. In a device of the class described, a drum including a plurality of sections and being capable of being expanded or contracted, a plurality of bars arranged within said drum and being capable of moving radially therein, connections between certain of said sections and said bars, and means for moving said bars.

13. In a device of the class described, a drum comprising a plurality of telescopic sections, a shaft extending centrally through said drum, a gear rotatably mounted on said shaft, means governed by the rotation of said gear for expanding or contracting said sections, and means for rotating said gear.

14. In a device of the class described, a drum comprising a plurality of telescopic sections, a shaft extending centrally through said drum, a gear rotatably mounted on said shaft, rack bars in said drum in mesh with said gear, a connection between certain of said sections and said rack bars, means for rotating said gear, and means for locking said gear to said shaft.

15. In a device of the class described, a drum comprising a plurality of telescopic sections, a shaft extending centrally through said drum, a gear rotatably mounted on said shaft, a plurality of rack bars carried by said shaft and being capable of moving radially within said drum, the said rack bars being in mesh with said gear, connections between certain of said sections and said rack bars, means for rotating said gear, and means for locking said gear to said shaft.

16. In a device of the class described, a drum comprising a plurality of telescopic sections, a shaft extending centrally through said drum, a gear rotatably mounted on said shaft, rack bars carried by said shaft and being capable of moving radially within said drum, the said rack bars being in mesh with said gear, links connecting the ends of said rack bars with certain of said sections, a counter shaft in said casing supported by and spaced from said first mentioned shaft, a pinion on said counter shaft in mesh with said gear, means for rotating said counter shaft, and means for locking said gear to said first mentioned shaft.

17. In a device of the class described, a drum comprising a plurality of telescopic sections, a shaft extending centrally through said drum, gears rotatably mounted on said shaft and in spaced relation to each other, rack bars carried by said shaft and in mesh with said gears, the said bars being capable of moving radially within said drum, a counter shaft carried by said first named shaft and in spaced relation to the latter, pinions on said counter shaft in mesh with said gears, means for rotating said counter shaft, and clutches for establishing or breaking a connection between said gears and said first mentioned shaft.

18. In a device of the class described, a drum comprising a plurality of telescopic sections, a shaft extending centrally through said drum and supporting the latter, means on said shaft for contracting or expanding said drum, and means for rotating said shaft step by step.

19. In a device of the class described, a drum, a shaft extending centrally through said drum, a counter shaft carried by said shaft, intermeshing gears on said shaft and counter shaft, a clutch for locking one of said gears to its respective shaft, rack bars engaged with the teeth of one of said gears, links connecting said drum and rack bars, means for operating said clutch, and means for rotating one of said shafts.

20. In a device of the class described, a polygonal drum comprising a plurality of telescopic sections hingedly connected together, each section comprising a pair of substantially U-shaped members, one of said members having its parallel arms to accommodate the corresponding arms of the opposing member, means for limiting the movement of said members relative to each other, the said members being adapted to hold cards, and means for expanding and collapsing said drum.

In testimony whereof I affix my signature in presence of two witnesses.

ALPHONSE FERNANDEZ.

Witnesses:
M. E. Jones,
D. B. Galt.

Copies of this patent may be obtained for five cents each, by addressing the "Commissioner of Patents, Washington, D. C."